Fig.1.

July 14, 1964  D. E. SINGELMANN  3,141,096
POWER BRIDGE TURBINE ARRANGEMENT

Filed July 3, 1961  7 Sheets-Sheet 2

INVENTOR.
DIETRICH E. SINGELMANN
BY
Bean, Brooks, Buckley & Bean
ATTORNEYS

United States Patent Office 3,141,096
Patented July 14, 1964

3,141,096
POWER BRIDGE TURBINE ARRANGEMENT
Dietrich E. Singelmann, Buffalo, N.Y., assignor to Bell Aerospace Corporation, Wheatfield, N.Y.
Filed July 3, 1961, Ser. No. 121,390
12 Claims. (Cl. 290—4)

This invention relates to power systems and in particular relates to apparatus for temporarily supplying power for a system during the interim between removal of one main power source from the line and application of an alternate main power source to the line.

In remotely located aircraft and missile warning system, it is customary to use a series of alternately usable stationary diesel engines for supplying the power to drive the electrical generating means used to power the computer system. In order to render the computer system practical, it is necessary that the voltage and operating frequency be maintained within relatively narrow limits. Needless to say, any complete or partial shut down of power will adversely affect the accuracy and usefulness of the warning system. Because of this, present systems frequently use as many as eight stationary power plants, only one of which is operating at one time, in order to assure substantially continuous operation. However, in any multiple power plant system, time delays in power supply occur whenever a stand-by power plant is brought into operation due to unexpected failure of an operating power plant. The time delay occurs by reason of the fact that some time, usually up to ten minutes, will elapse between the time of failure detection and the time at which the stand-by unit has been started and brought up to operating speed.

Of primary concern in connection with the present invention is the reduction of the aforementioned time delay, although it is to be understood that the present invention is not necessarily limited to the specific system above described.

More particularly, it is an object of the present invention to provide an intermediate or power bridge mechanism which will virtually eliminate power delay between failure detection of an operating power plant and bringing a stand-by power plant into operation by the provision of temporary, substantially instantaneous power mechanism.

A further object of the present invention resides in a turbine-torque converter assembly usable as a substantially instantaneous power mechanism.

In accordance with the preceding object, the present invention envisages the utilization of the instantaneous power mechanism in combination with a generator driven by an electric motor connected to the main power line which is supplied by one of a battery of diesel engine-generator units, in which case the instantaneous power mechanism acts solely as such, that is, as a power bridge mechanism to intervene between failure of one diesel engine-generator unit and operation of another.

However, the present invention also envisages the combination of such instantaneous power mechanism with each of a series of diesel engine-generator units which comprise the battery for main power supply. In this instance, by using a clutch between the diesel engine and generator in each case, the instantaneous power mechanism may be used both as a starter for the associated diesel engine (in which case the diesel engine and generator are coupled together through the clutch) and subsequently as a power bridge mechanism as aforesaid (in which case the clutch is disengaged).

This latter arrangement accrues certain advantages. For example, it simplifies the starting of the diesel engines. In this respect, it will be appreciated that large diesel engine units of the modern type use special compressed air motors for starting, which the present system would eliminate. Formerly, such diesel units were started by introducing air directly into the cylinders. However, oil contamination of the starting air (stemming from the piston air compressor) introduces the danger of untimely ignition of the starting air within the diesel engine, with consequent destruction of the air compressor. Hence the usage, in modern systems, of the aforementioned special compressed air motors for starting.

The foregoing and other objects and advantages of the invention will appear from the description hereinbelow and the accompanying drawings wherein.

Figure 4:
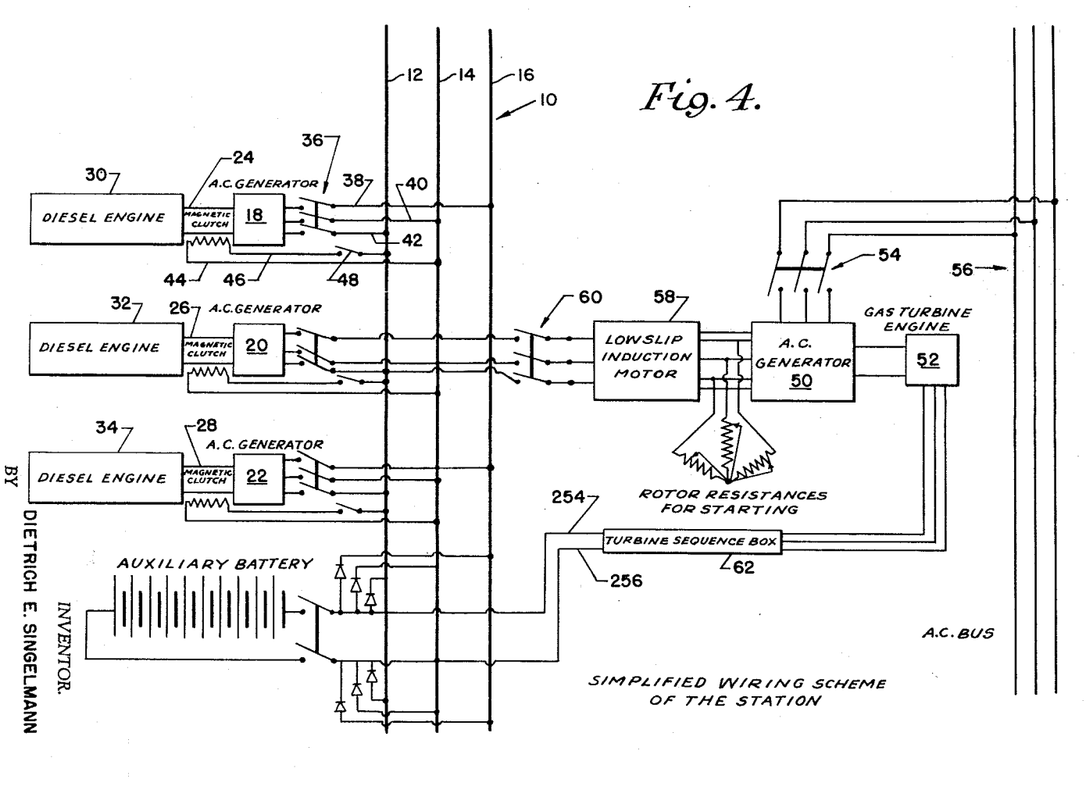
FIG. 4 is a diagramamtic view showing the layout of a power station having a power bridge mechanism associated therewith utilizing the turbine-torque converter assembly as is shown in FIG. 1.

Referring at this time more particularly to FIG. 4, one type of system in accordance with the present invention is illustrated therein. In this particular system, a main power line is indicated generally by the reference character 10 and in the particular instance shown comprises the three conductors 12, 14 and 16. The power line 10 is the internal A.C. bus for the power station and is coupled to a motor-generator assembly (hereinafter described) which assembly provides the external or consumer power. Connected in parallel to these conductors are a series of generators 18, 20 and 22. Each of these generators is coupled through the medium of a magnetic clutch as indicated by reference characters 24, 26 and 28 to corresponding diesel engine power units 30, 32 and 34 and each generator is similarly connected to the conductors 12, 14 and 16 as for example as shown in connection with the generator 18, the same being provided with a switch assembly indicated generally by the reference character 36 for selectively coupling the conductors 38, 40 and 42 to the main power line as is shown. Likewise, each of the magnetic clutch assemblies 24, 26 and 28 is similarly connected to the main power line by means of a conductor 44 connected to one of the lines 14 and a second conductor 46 connected to a switch mechanism 48 to another of the conductors 12 of the main line.

The system as so far described is entirely conventional in nature and is indeed of a common type although it is to be understood that many more diesel engine-generator units may be applied within the system for the purpose of assuring substantially continuous power supply. That is to say, it will be understood that normally, only one of the diesel engine-generator units will be operative to supply power for the station line 10. Theoretically with such an operation, it would be possible to provide a continuous and uninterrupted power supply for the line 10 so long as no unpredicted power failures would occur in the one diesel engine operating at a given instant. However, experience dictates that failures will occur in the diesel engines even though careful maintenance procedures are followed. Thus, for example, any one of the engines may, during its use, unexpectedly fail, as for example by bearing failure, and under such circumstances, it may well occur that the power supply in the line 10 will fall far below the rated value or in aggravated conditions may be entirely interrupted before another engine may be brought onto the line in association with its particular generator. The reason for this is that stationary diesel plants in particular, due to their large size, cannot be started instantly and there will be a lapse of several minutes before the diesel engine desired to be put onto the line is brought up to operating condition.

As previously mentioned, the internal bus or station line 10 is coupled to a motor-generator assembly for supplying the consumer power. In FIG. 4, the motor-generator assembly is indicated by reference characters 58 and 50 respectively and the consumer line by reference character 56. Thus, it is to be understood that generator 50 constitutes the consumer supply generator and that power for driving this generator will normally be supplied by one of the diesel engines 30, 32 or 34 and its associated generator 18, 20 or 22, through the motor 58.

In accordance with the present invention, a turbine-torque converter unit indicated generally by the reference character 52 is provided to effect power bridge between the time of failure detection of the unit 30, 32 or 34, whichever is operating, and the instant at which one of the other units may be applied to supply power for the line 10 and thus resume power to motor 58. In the particular instance shown in FIG. 4, the generator 50 is connected through a suitable switch mechanism 54 to the consumer power line 56. Normally, this generator 50 is driven by the induction motor 58 which is connected to the station power line 10 through the switch mechanism indicated generally by the reference character 60. During normal operation, both switch 60 and switch 54 are closed so that generator 50 supplies the consumer power through line 56. However, upon detection of failure of the operating unit 30, 32 or 34, electrical mechanism 62, hereinafter more particularly described, operates to immediately throw the turbine 52 into operation to continue the drive of the generator 50. The operation of the turbine is continued until such time as the next unit 30, 32 or 34 can be brought into operation to supply the station power line 10 and thus provide power to the motor 58 to drive generator 50 therefrom.

Figure 1:
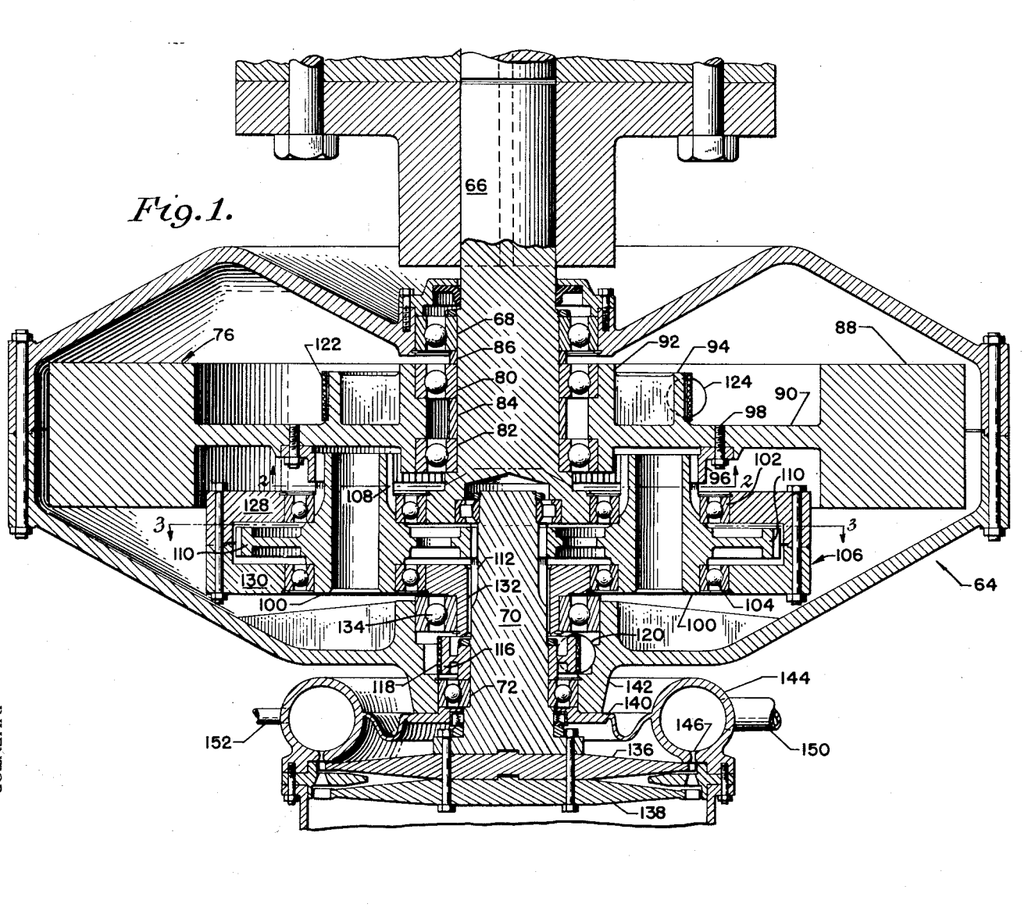
FIG. 1 is a sectional view of a turbine-torque converter unit constructed in accordance with the present invention and illustrating the principles thereof.

Reference is now had to FIG. 1 wherein the details of the turbine-torque converter unit are shown. In this figure, reference character 64 indicates in general the housing or casing for the torque converter unit. Leading into one side of this casing is the main shaft 66 suitably supported therein as by a bearing assembly 68 whereas leading into the other side of the casing 64 is the turbine shaft 70 suitably journalled therein by bearing 72, substantially as is shown. A flywheel assembly indicated generally by the reference character 76 is rotatably mounted on the main shaft 66 as by bearings 80 and 82 separated by the spacer element 84. A further spacer 86 is interposed between the two bearings 68 and 80 to properly position the flywheel 76 away from the opposed surface of the casing 64.

The flywheel is provided with an enlarged rim portion 88 representing a substantial portion of its mass and the web 90 thereof which connects the mass 88 to the hub 92 of the flywheel is provided at one side with a circumferentially extending and laterally projecting brake rim portion 94 whereas on the opposite side thereof there is provided an internal gear 96 which, as shown, may be separate from the flywheel web 90 and secured thereto as by suitable fasteners 98. In mesh with this internal gear 96 are one or more planet gears 100 which are suitably journalled as by bearings 102 and 104 in a carrier assembly indicated generally by the reference character 106. The planet gears 100 are of the compound type having one portion 108 with a relatively small number of teeth and a further portion 110 having a much greater number of teeth, the latter of which mesh with the pinion gear 112 on the turbine shaft 70. Splined or otherwise suitably feathered or secured to the turbine shaft 70 is a brake flange 116 and surrounding the same is a brake band 118 selectively operable to engage and disengage the member 116 under the action of a suitable mechanism 120 which in the preferred instance takes the form of an electromagnetic actuator. Likewise, the brake flange 94 on the flywheel assembly is surrounded by a brake band 122 and suitably mounted on the casing 64 is an actuator 124 therefor.

It will be noted that the carrier assembly 106 is directly coupled to the main shaft 66. In the specific instance shown, one side portion 128 of the carrier casing is integrally formed with the main shaft 66 and the other side 130 of this carrier is provided with a lateral hub extension 132 receiving bearing support from the casing 64 through the medium of the bearing assembly 134. The turbine shaft 70, on the other hand, has detachably secured thereto a plurality of turbine wheels such as those indicated by reference characters 136 and 138 and the casing of the turbine is flanged as at 140 for detachable securement to the hub portion 142 of the casing 64. The turbine assembly is entirely conventional in construction and includes a manifold or shroud portion 144 having circumferentially arranged nozzle passages 146 for discharge against the blades of the turbine wheels 136 and 138. The manifold 144 of the turbine assembly is provided with a pair of inlet connections 150 and 152, the purpose of which will be described hereinafter.

Relating the structure as is shown in FIG. 1 back to the system as is shown in FIG. 4, the main shaft 66 as shown in FIG. 1 is coupled directly to the shaft of the generator 50 so that the carrier 106 is rotated in unison with the generator 50. During normal operation, the motor 58 in FIG. 4, driving the consumer supply generator 50 will rotate the carrier 106 in unison therewith. At such time, the brake band 118 is applied so as to hold the turbine shaft 70 stationary whereas the brake band 122 is released to permit free rotation of the flywheel assembly 76. The drive is of course through the main shaft 66 the carrier 106 and through the planet gears 100 to the flywheel assembly 76.

Now, assuming a normal operation in which only one of the units 30, 32 or 34 is operative, and the above situation prevails in relation to the motor 58, the generator 50 and the turbine-torque converter unit 52, and further assuming that the particular unit 30, 32 or 34 which is driving develops trouble which reduces the power output of the unit. In such instance, suitable mechanism, hereinafter described, detects the power loss and starts the sequence of operation for the power bridge mechanism. Such detecting device would be included in the turbine sequence box indicated by the reference character 62 in FIG. 4. First of all, the sequence will be such that the manifold 144 of the turbine, FIG. 1, will be pressurized and then the brake band 118 will be released by the actuator 120 permitting the turbine to operate and start turning the turbine shaft 70. The torque of the turbine shaft 70 is in such direction as to oppose the rotation of the flywheel mechanism and the combination of the power supplied by the turbine shaft 70 and the energy released by the slowing down of the flywheel mechanism 76 will drive the main shaft 66 to maintain and continue power through the consumer power line 56. When the turbine has come up to its operating speed, the motion of the flywheel 76 will be stopped and at that point, to prevent reverse rotation of the flywheel and consequent loss of power, the brake band 122 is applied by the actuator 124.

Figure 5:
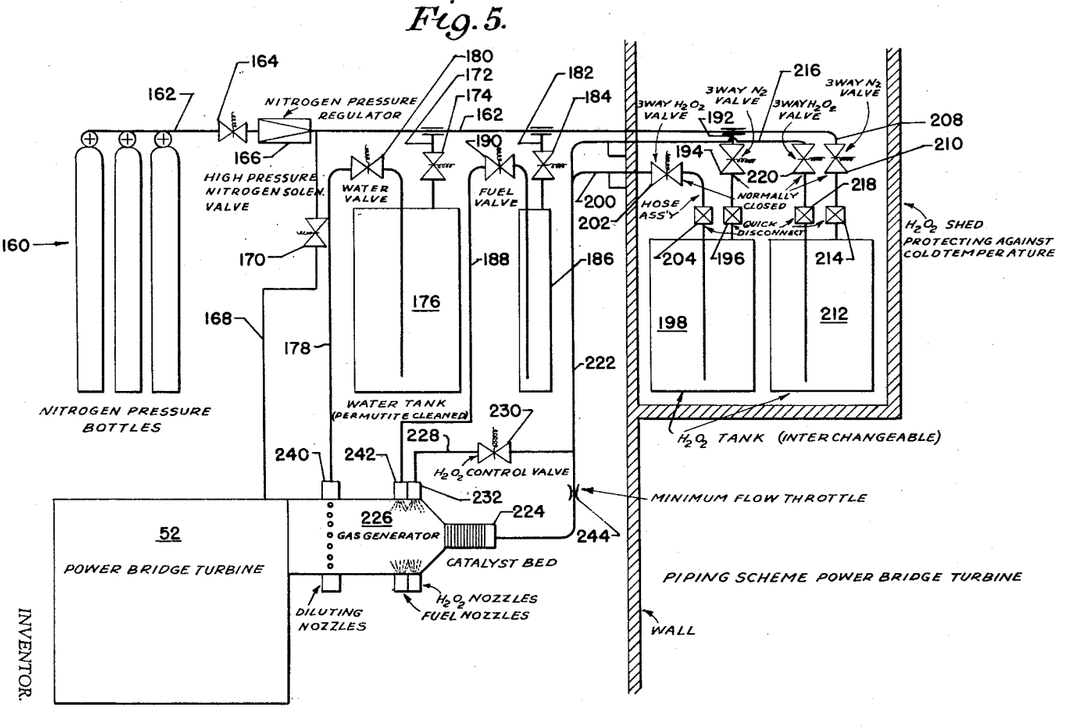
FIG. 5 is a diagrammatic view illustrating the power supply mechanism for the turbine.

Referring at this time more particularly to FIG. 5, a preferred embodiment of energy source for the turbine assembly 52 is shown. In this figure, reference character 160 designates a source of nitrogen under pressure consisting of individual bottles of compressed nitrogen connected by means of line 162 through valve 164 to a pressure regulating device 166. The line 162 continues beyond the pressure regulator 166 and several subsidiary lines are tapped thereinto. The first of these subsidiary lines is the conduit 168 which leads, through a valve 170, directly to the turbine and would be connected thereto as at 152, see particularly FIG. 1. The next subsidiary line is designated by reference character 172 and leads from the main line 162 through the valve 174 to a water tank 176. By this connection, the source of water is subjected to pressure and the water distribution conduit 178 leads therefrom, being provided with a control valve 180. The next subsidiary line is the conduit 182 leading, through valve 184 to a diesel fuel tank 186 which, like the water supply system 176 is provided with a lead off conduit 188 provided with a control valve 190. The next subsidiary line is the line 192 provided with a control valve 194 and a quick disconnect coupling 196 leading to a hydrogen peroxide tank 198 to pressurize the same. Leading off from this tank 198 is the distribution line 200 having a control valve 202 therein and also provided with a quick disconnect coupling 204. The last branch of the main line 162 is a subsidiary line 208 which leads, through control valve 210 to a second hydrogen peroxide tank 212, being provided with a quick disconnect coupling 214 substantially as described in connection with the first tank 198. The lead off line 216 from tank 212 is provided with a quick disconnect coupling 218 and a control valve 220 and joins the previously mentioned lead off line 200 to provide a common hydrogen peroxide line 222 leading to a catalyst bed 224 and issues thence into a gas generator chamber 226. A bleed off line 228, provided with a control valve 230, leads to a series of circumferentially arranged hydrogen peroxide nozzles 232 issuing into the gas generating chamber 236 and the water distribution line 178 as well as the diesel fuel line 188 are likewise connected to respective nozzles 240 and 242. The gas generator chamber 226 is connected to the manifold of the turbine through the line 150. The purpose of the nitrogen line 168 is to provide a substantially instantaneous source of pressure for the turbine to reduce the pressure build-up delay thereto as much as is practical and possible since, as is well understood, some period of time will be required for the hydrogen peroxide line 222, acting through the catalyst bed 224 to build-up pressure within the gas generating chamber 226. The reaction of the hydrogen peroxide within the catalyst bed of course evolves high temperature gaseous products comprising oxygen and super heated water vapor. The oxygen content of this gaseous product is utilized in conjunction with the diesel fuel to burn the same and it will be realized that the flow through the catalyst bed is restricted by a suitable throttle valve 244 so that the flow is only to that extent required to maintain the temperature within the gas generator 226 at the desired level. That is to say, a great deal of the hydrogen peroxide utilized in the system is bled through directly into the gas generator chamber through the bleed off line 228.

Figure 6:
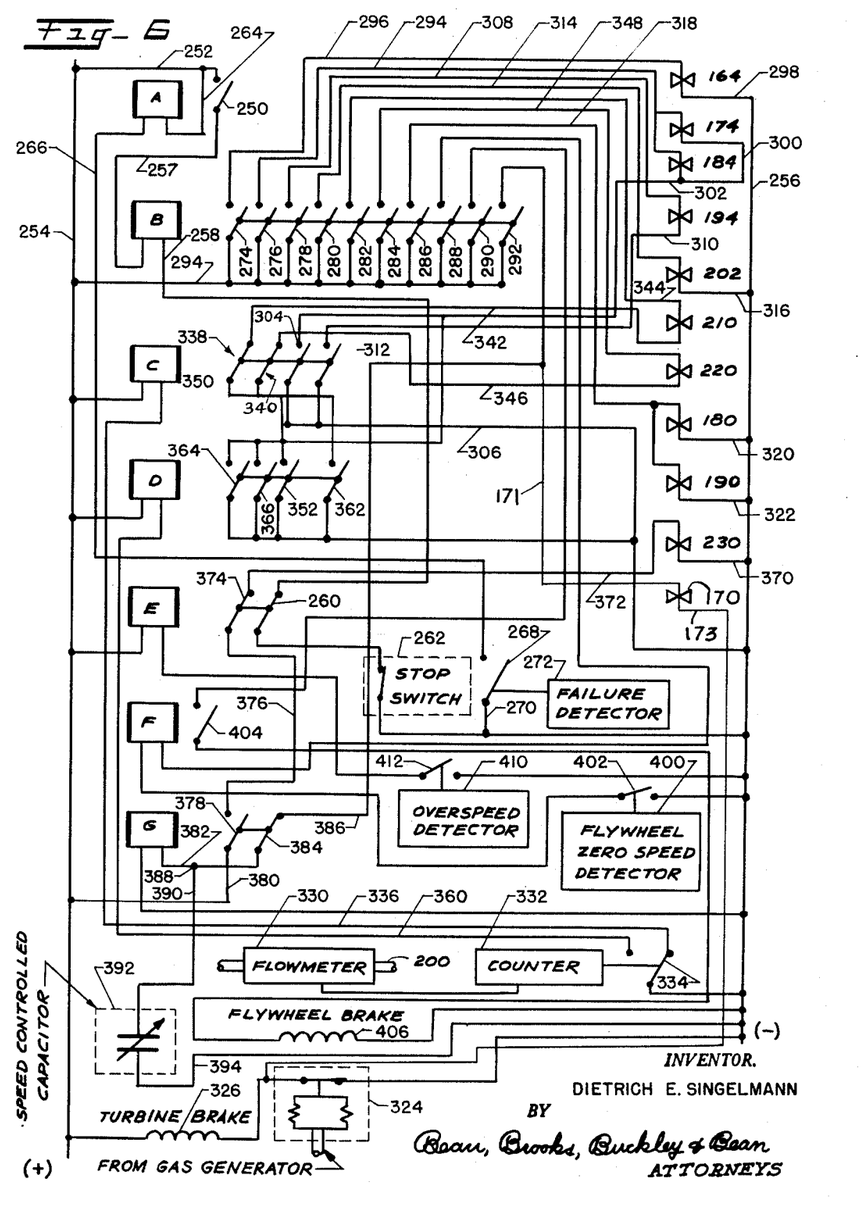
FIG. 6 is a circuit diagram illustrating the controls for the power bridge system as is depicted in FIGS. 4 and 5.

Referring now more particularly to FIG. 6, illustrated therein is a schematic diagram illustrating a practical embodiment of a control system to operate the assemblage as is depicted in FIG. 5. The turbine sequence box 62 (FIG. 4) incorporates a plurality of relays designated A, B, C, D, E, F and G of which the relay A is the start relay and controls a normally open switch 250, one contact of which is connected through conductor 252 to the main power conductor 254, the other side of the power conductor system being indicated by reference character 256. The other contact of switch 250 is connected through conductor 257 to the relay B and the other side of this relay is connected through conductor 258, the normally closed switch 260 of relay E, the normally closed stop switch 262 to the other supply conductor 256 as shown. The relay A, on the other hand, is connected to the power conductor 256 by means of a conductor 264 whereas the other side thereof is connected through conductor 266 to one contact of a normally open failure detector switch indicated generally by the reference character 268. The other side of this switch 268 is connected, through conductor 270 to the other main power conductor 256. The failure detector switch 268 is controlled by a suitable failure detection device indicated generally by the reference character 272 but is preferably of the electric frequency governor type and detects of predetermined frequency deviation of the main power system 10, see FIG. 4, to thereby close the normally open switch 268 to actuate relay A and close the normally open switch 250 thereof. Closing the switch 250 of course actuates the relay B which operates to close the several normally open switches 274, 276, 278, 280, 282, 284, 286, 288, 290 and 292 thereof.

When the relay B is actuated, it will be noted that the switch 274 thereof operates to open the high pressure nitrogen valve 164. The connection to this valve 164 is made from one side of the switch 274 through the common conductor 294 for all of the relay switches B and through the conductor 296 which extends to the valve 164, the circuit being completed through the conductor 298 from the valve to the power conductor 256. At the same time, the switch 276 of relay B which controls the two low pressure nitrogen valves 174 and 184 for supplying water and fuel respectively, are closed. The circuit for these two valves continues from the common conductor 294, through the conductor 300 which is connected to both valves and thence through the conductor 302 to the switch 304 of relay C and thence through a common conductor 306 to the other power conductor 256. However, the circuit to valves 174 and 184 is completed because relay C is initially energized so that switch 304 is closed. The switch 278 of relay B completes the circuit to the low pressure nitrogen valve 194 which controls the supply from the first hydrogen peroxide tank 198. The circuit for this valve includes the conductor 308 which is connected to one side of the valve 194 and the conductor 310 which extends therefrom through the switch 312 of relay C and thence to the common conductor 306 previously described. This circuit is also completed due to energization of relay C. At the same time, the hydrogen peroxide supply valve 202 is opened through the circuit including the switch 280 of relay B, the conductor 314 which extends to valve 202, the other side of which is connected directly through the conductor 316 to supply conductor 256. The only other valve circuit which is operative through relay B at the moment of starting is through the switch 286, conductor 318 down to the two valves 180 and 190 which respectively control the supply of water from the tank 176 and the supply of diesel fuel from the tank 186, these two valves being directly connected as at 320 and 322 to the power conductor 256.

However, it is to be noted that since the valve 202 as well as the valve 194 is opened at this time, hydrogen peroxide will be delivered to the catalyst bed 224 and, as well, water and fuel will be supplied through the lines 178 and 188. As soon as sufficient pressure has been built up in the gas generator 226, a pressure sensitive switch 324 is opened which releases the turbine brake, the electromagnetic coil of which is indicated by reference character 326. Thus, power is applied to the turbine and the same initiates its power bridge operation. At the same time, valve 170 is open by virtue of its connection to relay B switch 292 through conductor 171, the valve also being connected to line 256 through conductor 173 through flywheel zero speed switch 402.

A flow meter 330 is connected in the hydrogen peroxide supply line 200 which is in turn connected to a counter mechanism 332. The purpose of this assembly is to determine when the hydrogen peroxide tank 198 is approaching the empty condition. As soon as this tank 198 approaches empty, the counter 332 operates to actuate the switch mechanism 334 thereof. The normally closed contact portion thereof includes the circuit through conductor 336 to one side of relay C so that, normally, the relay C is actuated. Thus, during the time the tank 198 is supplying hydrogen peroxide, the relay C is actuated rendering the contacts 304 and 312 thereof normally closed and the contacts 338 and 340 thereof normally open. Since the two valves 174 and 184 have their circuits completed through the switch 304, these valves are opened at any time during which the counter 332 is in the position shown in FIG. 6, that is when the tank 198 is not substantially empty. The relay C switch 338 completes the circuit through conductor 342 to valve 210 and thence through conductor 344 to relay B switch 282. The relay C switch 340, on the other hand, completes that portion of the circuit through conductor 346, through valve 220 and through the conductor 348 to the relay B switch 284. Since the two relay C switches 338 and 340 extend through the conductor 350 to the normally open switches 352 and 362, such valves as are controlled by the associated circuits, namely the valves 210 and 220 are not opened until such time that relay C is deenergized and relay D is energized. Actuation of relay D is controlled by the counter 332 and when the same has broken the circuit through conductor 336 and established the circuit through conductor 360, the relay D will be actuated. At this time, the normally open switches 352, 362, 364 and 366 thereof will be closed. Thus, it will be seen that the two relays C and D are alternately actuated, the relay C being first actuated until the counter 332 breaks the circuit thereto and establishes the circuit to the relay D.

It will be noted that the circuits to the valves 174 and 184 include the normally open C relay switch 304 and in parallel therewith normally open D relay switch 364. Likewise, it will be noted that the normally open switch 312 controlling the valve 194 is in parallel with the normally open D relay switch 366. However, since during operation relay C will always be energized while relay D is off and vice versa, the circuits to the various valves 174, 184 and 194 will always be complete. In regard to valves 210 and 220, they can be actuated open only when relay C is deenergized and relay D is energized since the circuits for these valves include, respectively, switch 338 of relay C to switch 352 of relay D and switch 340 of relay C to switch 362 of relay D. Thus, the only condition in which the circuits through the valves 210 and 220 can be completed is when the relay C is off and the relay D is on, or after the first H₂O tank 198 has been emptied. However, it will be noted that the valves 194 and 202 are always operating so that with the counter 332 properly adjusted, there will be an overlap in the discharge from the two tanks 198 and 212 to assure a continuous flow of hydrogen peroxide to the system.

In regard to the relay G, the same is utilized to control the main flow of hydrogen peroxide through the valve 230. To this end, it will be seen that the valve 230 is connected directly as at 370 to the conductor 256 and at its other side is connected, through conductor 372 to the normally closed switch 374 of relay E. Normally, relay E is deenergized as will be hereinafter set forth. From the switch 374, the circuit through valve 230 continues along conductor 376 to normally open switch 378 of relay G, and thence to the conductor 254 through wire 380. For control of relay G, it will be seen that the conductor 382 thereof is connected through relay G normally closed switch 384, through conductor 386 to the normally open switch 292 of relay D. As soon as relay D is actuated, switch 292 is closed and current will flow to the junction 388 where it will be branched through conductor 382 and conductor 390. The speed control capacitor assembly indicated generally by the reference character 392 therefore acts as a threshold for control of the relay G. That is to say, if sufficient current is shunted through the conductor 390 and the capacitor 392 through the conductor 394, the relay G will not be operated and, under these conditions, the main control valve 230 will remain closed. However, as soon as the turbine has reached the speed at which the capacitor 392 will permit sufficient current to drain through conductor 382 to operate relay G, valve 230 becomes operative.

Regarding relay F, its function is to control the flywheel brake and the same is normally deenergized until the flywheel zero speed detector 400 closes the normally open switch 402 thereof to complete the circuit through the relay F and the switch 288 of relay D. The normally open switch 404 of relay F is in a circuit containing relay B switch 290 and the flywheel brake mechanism 406 to thereby brake the flywheel when the same has reached zero speed as determined by detector 400.

To protect the system as is shown in FIG. 6 from overspeeding of the turbine, an overspeed detector 410 is utilized therein having a normally open switch 412 controlling the relay E. Upon closing of switch 412, the relay E becomes deenergized which, through normally closed switch 260, breaks the circuit to relay D and which, through normally closed switch 374, assures shut down of the main hydrogen peroxide supply valve 230. The stop switch 262 may conveniently be connected for automatic opening upon the proper introduction of the standby diesel engine into the line.

Figure 2:
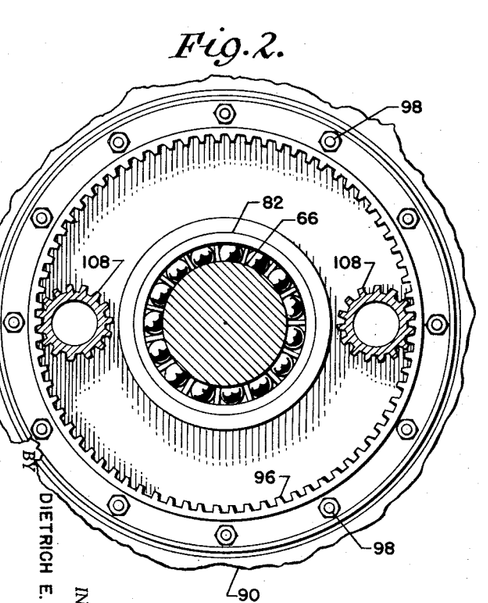
FIG. 2 is a section taken substantially along the plane of section line 2—2 in FIG. 1 and further showing details of the internal construction of the device.
Figure 3:
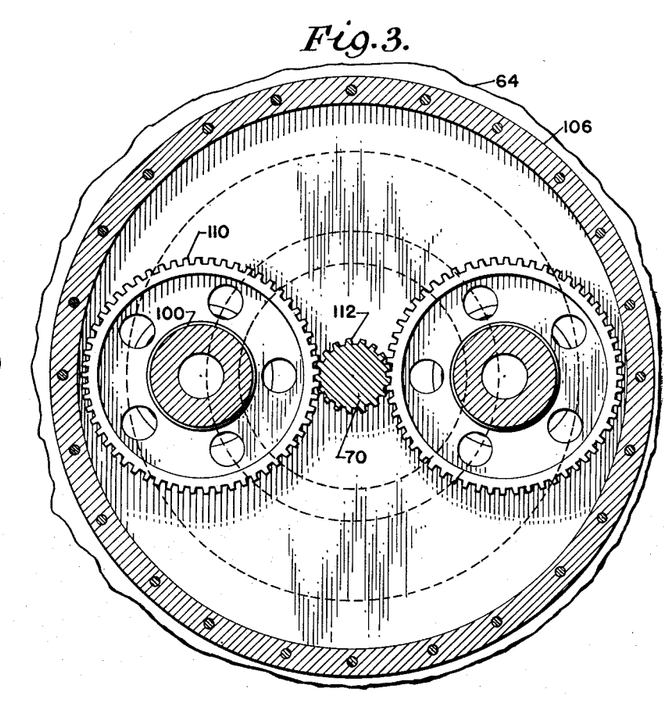
FIG. 3 is a sectional view taken substantially along the plane of section line 3—3 in FIG. 1 showing still further details of the construction of the turbine-torque converter unit.
Figure 7:
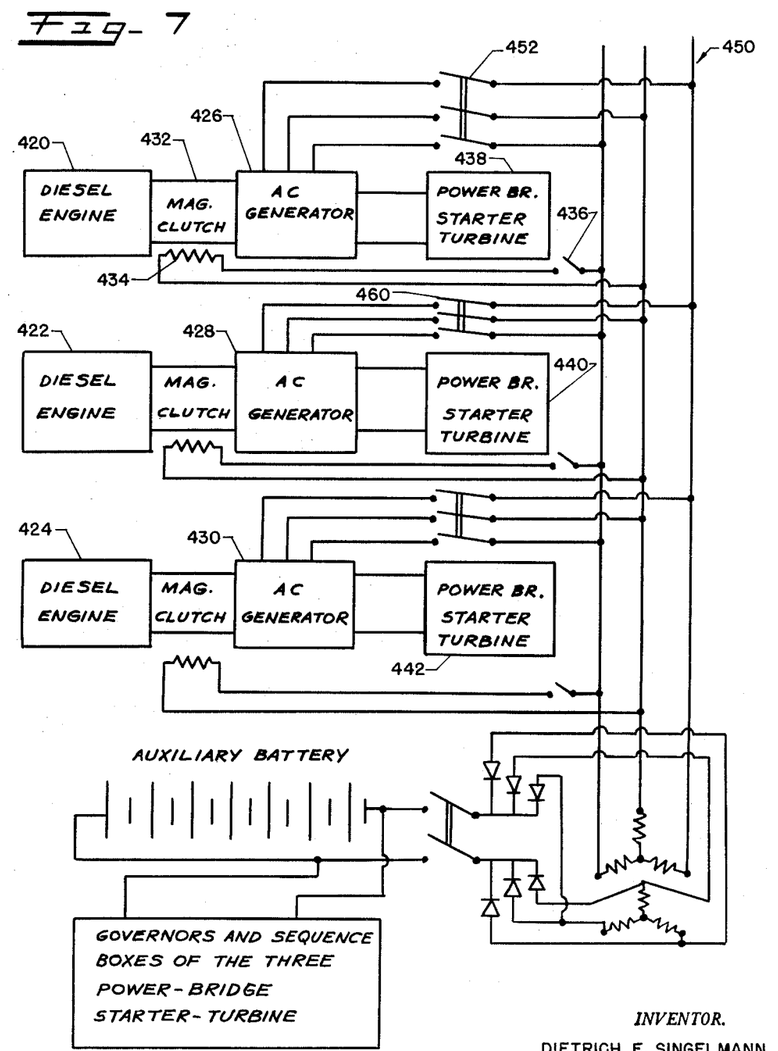
FIG. 7 is a schematic view similar to FIG. 4 but showing the use of the turbine-torque converter mechanism individually in combination with a diesel engine-generator unit in each case whereby the turbine-torque converter unit in each case may be used either as a starter for its associated diesel engine or as a power bridge mechanism.

Referring now more particularly to FIG. 7, the modified system as is shown therein incorporates a plurality of diesel engine units 420, 422 and 424, each having a generator 426, 428 or 430 associated therewith. The generators in each case are coupled to their respective diesel engines by magnetic clutch assemblies such as that designated by the reference character 432 having control 434 for selectively operating the same connected to the main circuit including a manually operable switch 436. Each generator, in turn, is connected to a power bridge and starter turbine assembly such as those indicated by reference characters 438, 440 and 442, each of which assemblies is similar in construction and operation to that described specifically hereinabove and as is shown in FIGS. 1-3 inclusive.

In the system according to FIG. 7, each of the generators 426, 428 and 430 is selectively coupled to the main or consumer line 450 by means of switches such as the switch 452 for each of the individual units and the arrangement according to the system of FIG. 7 is specifically different from that described hereinabove inasmuch as the turbine units in each case operate not only as power bridges but also as starters for the associated diesel engines with which they are associated. It is well known that starting devices for diesel engines are problematical and in association with the instant invention, it is extremely feasible to provide both the power bridge and starting function with the turbine arrangement specifically disclosed. Thus, assuming that the diesel engine 420 in FIG. 7 is operative to drive the generator 426 to the magnetic clutch 432 with the switch 452 thereof closed, upon detection of failure in the line 450 the turbine unit 438 in FIG. 7 can conveniently operate as a power bridge through a circuit arrangement similar to that shown in FIG. 6 and operating in conjunction with a system such as is shown in FIG. 5 to provide the necessary power bridge before one of the other engines 422 or 424 can be brought into operation.

At this time, the engine 422 or 424, assume the engine 422, desired to take over the generating operation, is coupled to its associated generator 428 leaving the generator switch assembly 460 opened. The turbine assembly 440 is operated by low pressure nitrogen, the valve 170 in FIG. 5, to drive, through the epicyclic gear system, the generator 428 and thence through the magnetic clutch to the diesel engine 422 for starting purposes. At this time, it is understood that the turbine brake is released and the flywheel brake on. Assuming the engine 422 has been properly started, the starting circuit, hereinafter described, is shut down and the switch 460 is closed to let the engine 422 take over the line supply.

Figure 8:
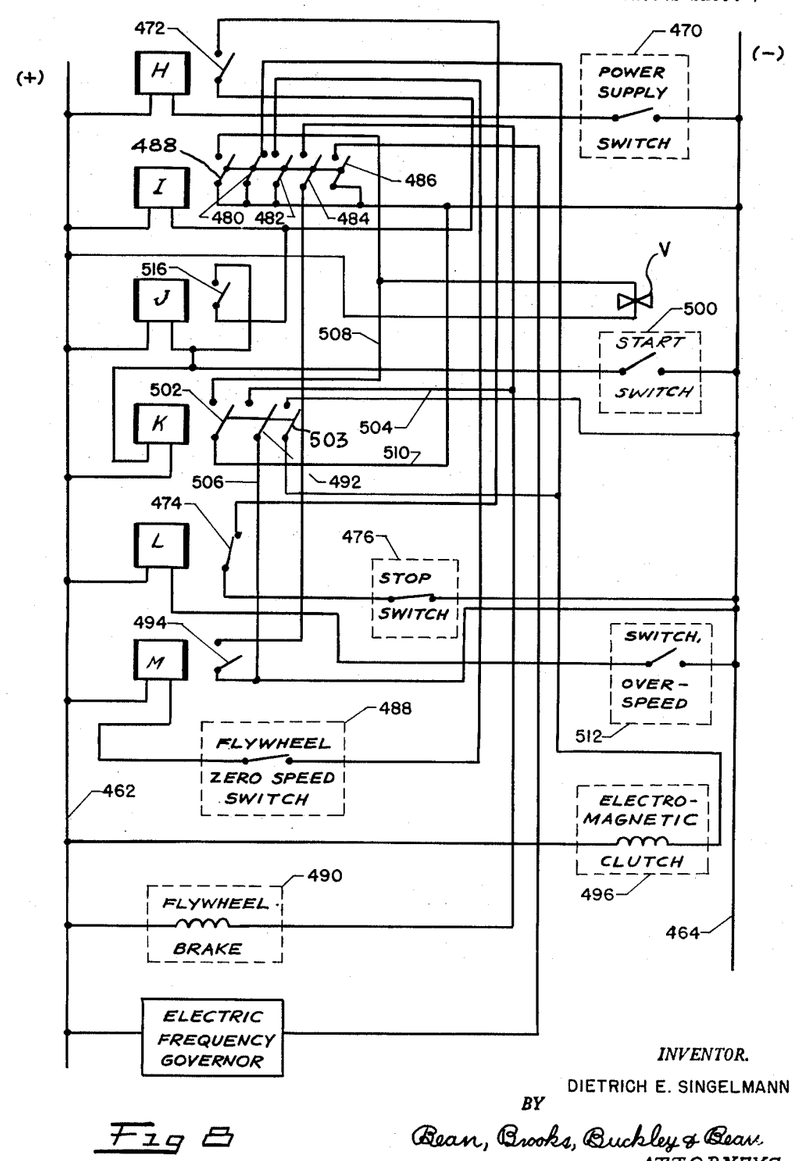
FIG. 8 is a diagram of the circuit utilized to control the mechanism in association with the system shown in FIG. 7.

FIG. 8 shows the starting circuit utilized in conjunction with the power bridge starter turbines when the same are desired to be used also for starter operation. In this figure, the control circuit power conductors are indicated by reference characters 462 and 464 and a series of relays H, I, J, K, L and M are associated therewith as shown. The relay H is energized by closing the power supply switch 470 to thus close the normally open contact switch 472 thereof. The switch 472 completes a circuit through the relay I so long as the relay L is maintained deenergized so as to retain its normally closed switch 474 in the closed condition and so long as the manually controlled stop switch 476 also remains closed. The relay I includes a series of switches 478, 480, 482, 484 and 486.

The relay M is energized through a normally open flywheel zero speed switch 488 and the switch 482 of relay I. It will be noted that the flywheel brake 490 is actuated to hold the flywheel through the medium of either switch 484 of relay I or through the switch 492 of relay K, the switch 484 being in series with the normally opened switch 494 of relay M. Thus, the flywheel is braked when either or both relays I and K are energized, the latter case assuming relay M is also energized, which occurs as a result of the flywheel zero-speed sensing switch 488. The stop circuit also includes a control for an electromagnetic switch 496 of the associated motor which is completed through the normally closed switch 480 of the relay I so that whenever the power supply is operative, the clutch is disengaged from the diesel driving.

However, when the start switch 500 is actuated, relay K engages the clutch via switch 503 so that whenever the starting cycle is operative, the clutch is engaged to turn the diesel engine by the associated power turbine through the associated clutch and generator. The start switch 500 can be manually actuated and completes the circuit to relay K, closing its switches 492, 502 and 503. The switch 492 completes the circuit through the flywheel brake 490 through conductor 504 and conductor 506 whereas the switch 502 completes the circuit through the nitrogen valve V through conductor 508 and conductor 510 and as specified above, switch 503 completes the circuit to clutch 496. The switch contact 486 of relay I is in parallel with the switch 502 so that when either the relay I or the relay K is actuated, the valve V is opened. Thus, the start switch 500 need only be depressed momentarily to assure that the relay I is actuated and to simultaneously open the valve V, actuate the flywheel brake 490 and actuate the electromagnetic clutch 496. After the start switch 500 is released, the relays I and M take over control of the flywheel brake 490 whereas the relay I takes over the control of valve V and relay K controls the electromagnetic clutch. To protect the system, an overspeed switch 512 is provided which, when closed, actuates the relay L and opens the switch 474 thereof thus breaking the circuit to relay I. The manually actuated stop switch 476 serves the same purpose.

The gear ratios selected for the torque converter are such that the flywheel 76 turns about 10 to 20% faster than the rated speed of the generator to which it is coupled, that is, when the turbine is at a standstill. With this condition prevailing, the rate of deceleration of the flywheel is very much less than the rate of acceleration of the turbine, during power bridge operation, in response to maintaining the generator shaft speed constant. Thus, the torque requirements of the turbine are maintained relatively low. Because of this, turbine control may be readily accomplished by the system shown in FIG. 5 and controlled as by FIG. 6. That is to say, the only variable control necessary in FIG. 6 is the valve 230, which is so controlled that gas flow to the turbine is very much below rated capacity at zero turbine speed and is gradually increased to about twice rated capacity and then decreased to normal when the flywheel reaches zero speed. In a practical embodiment of the invention, using a generator shaft speed of 1200 r.p.m., the turbine speed, with flywheel braked, is 22,000 r.p.m. The controls, FIG. 6, apply a gas flow such that the same reaches normal rated capacity at about 7000–8000 r.p.m. of the turbine, increasing between 8000 and 22,000 r.p.m. to a maximum of about 210% of rated capacity shortly before the flywheel reaches zero speed and then decreasing to normal after the flywheel is braked at zero speed.

It is to be understood that certain changes and modifications as illustrated and described may be made without departing from the spirit of the invention or the scope of the following claims.

What is claimed is:

1. A power supply system comprising at least two alternately usable power plants, power generating means driven by said power plants, said power generating means including a rotating generator, and a power bridge mechanism coupled to said rotating generator, said mechanism comprising a flywheel rotated by said rotating generator, a normally stationary turbine, and epicyclic gear means, said gear means having one power path between said generator and said flywheel and another power path between said turbine and said generator, and control means for actuating said turbine, in opposition to said flywheel, responsive to power failure of the operating power plant.

2. In the system according to claim 1 wherein said control means includes a normally operative brake for said turbine, a normally inoperative brake for said flywheel, means for releasing said turbine brake responsive to power failure of the power plant, and means for actuating said flywheel brake responsive to cessation of flywheel motion.

3. The system according to claim 1 wherein said rotating generator is driven directly by said operating power plant.

4. The system according to claim 1 wherein said power plants are each coupled to a generator, a motor connected to said rotating generator and operatively driven by that generator coupled to said operating power plant, said power bridge mechanism being coupled to said rotating generator.

5. The system according to claim 1 wherein a generator is coupled to each power plant, and a power bridge mechanism coupled to each generator.

6. The system as defined in claim 5 wherein additional control means is provided for driving a stand-by power plant directly from its associated turbine.

7. The system according to claim 6 wherein said additional control means includes said means for braking said flywheel, and said means for braking said turbine.

8. The system according to claim 1 wherein said control means includes a pressure manifold for said turbine, means for metering diesel fuel and water to said manifold, a catalyst bed connected to said manifold, a source of hydrogen peroxide for said catalyst bed, and means for variably supplying hydrogen peroxide directly to said manifold to control the torque output of said turbine.

9. In a power supply system, a driven member, an epicyclic gear system connected to and driven by said driven member, said gear system having a pair of power paths, a flywheel connected to one of said power paths and a turbine connected to the second of said power paths, brake means normally inactivating said second power path whereby said flywheel is driven directly by said driven member, control means responsive to slowing of said driven member to actuate said turbine and release said brake whereby power is delivered to said driven member from said turbine and through said second power path in opposition to said flywheel, and means for preventing reverse rotation of said flywheel.

10. In a power supply system, a plurality of prime movers, a driven member, and means for driving said driven member selectively from one of said prime movers, the improvement consisting of means for temporarily supplying power to said driven member in the interim during switching from one prime mover to another, the last mentioned means including an epicyclic gear train coupled to said driven member and having a pair of power paths therefrom, inertia means connected to one power path and a turbine connected to the other power path, brake means normally holding said other power path inactive, and means responsive to a drop in power to said driven member to actuate said turbine and release said brake means.

11. In a power supply system, a pair of stationary diesel power plants, a generator coupled to each power plant, one of said power plants being operating and the other stand-by, an epicyclic gear system connected to each generator, each gear system having a pair of power paths, a flywheel connected to one of said power paths and a turbine connected to the second of said power paths, brake means normally inactivating said second power path, control means responsive to slowing of said driven member to actuate said turbine and release said brake whereby power is delivered to said driven member from said turbine and through said second power path in opposition to said flywheel, means for preventing reverse rotation of said flywheel, and additional control means for driving the stand-by power plant directly from its turbine.

12. In a power supply system for supplying substantially constant electrical power, a prime mover,
   generator means driven by said prime mover for supplying electrical power, and
   power bridge means connected to said generator means for temporarily maintaining the rotational speed thereof in the event of a failure of said prime mover, said power bridge means including a flywheel driven by said generator means, a normally inactive power plant adapted for rotation in opposition to the rotation of said flywheel and gear means connecting said flywheel and said normally inactive power plant.

References Cited in the file of this patent

UNITED STATES PATENTS

| | | |
|---|---|---|
| 1,159,752 | Fisher | Nov. 9, 1915 |
| 2,567,636 | Cuny | Sept. 11, 1951 |

UNITED STATES PATENT OFFICE
CERTIFICATE OF CORRECTION

Patent No. 3,141,096　　　　　　　　　　　　　July 14, 1964

Dietrich E. Singelmann

It is hereby certified that error appears in the above numbered patent requiring correction and that the said Letters Patent should read as corrected below.

Column 9, line 4, for "428" read -- 430 --; line 36, for "switch" read -- clutch --.

Signed and sealed this 10th day of November 1964.

(SEAL)
Attest:

ERNEST W. SWIDER
Attesting Officer

EDWARD J. BRENNER
Commissioner of Patents